J. H. FRIEDENWALD.
TRAVEL DETECTOR OR INDICATOR FOR TIRES AND THE LIKE.
APPLICATION FILED APR. 15, 1909.

1,144,961.

Patented June 29, 1915.

ATTEST.

INVENTOR
JACOB H. FRIEDENWALD.

UNITED STATES PATENT OFFICE.

JACOB H. FRIEDENWALD, OF BALTIMORE, MARYLAND, ASSIGNOR, BY MESNE ASSIGNMENTS, TO JOSEPH M. GILBERT, OF NEW YORK, N. Y.

TRAVEL DETECTOR OR INDICATOR FOR TIRES AND THE LIKE.

1,144,961. Specification of Letters Patent. Patented June 29, 1915.

Application filed April 15, 1909. Serial No. 490,137.

*To all whom it may concern:*

Be it known that I, JACOB H. FRIEDENWALD, citizen of the United States, residing at Baltimore, Maryland, have invented certain new and useful Improvements in Travel Detectors or Indicators for Tires and the like, of which the following is a specification.

My invention is designed to provide means by which tire manufacturers can determine accurately the amount of travel to which tires are subjected, this being a very important matter in view of the guarantee given by manufacturers as to the wear of the tire, or the number of miles the tire is good for and lacking which a rebate may be demanded. At present, so far as I am aware, there is no way to determine this, and it is necessary to depend upon the statement of the purchaser.

My invention not only provides means to establish conclusively the number of miles traveled by the tire, but to have these means so carried by or within the tire as to furnish knowledge as to the use of the tire without the user knowing that the tire contains such an indicator or register. It is not absolutely necessary to the successful operation of the invention that it shall be carried secretly, but it may be thus carried.

In carrying out my invention I find that I can make the registering mechanism exceedingly small, while perfectly accurate, and of such dimensions as to enable me to carry and conceal the entire register within a recess formed in the material of the tire. It may be sealed therein and only opened by the manufacturer when the tire is returned for any purpose and thus the manufacturer is enabled to have an unerring record of the number of miles the tire has traveled and to judge as to the justice of any claim that may be made for a rebate.

I do not limit myself to any particular form of registering device nor to its location, nor do I insist that the device shall be concealed within the tire.

Figure 1:
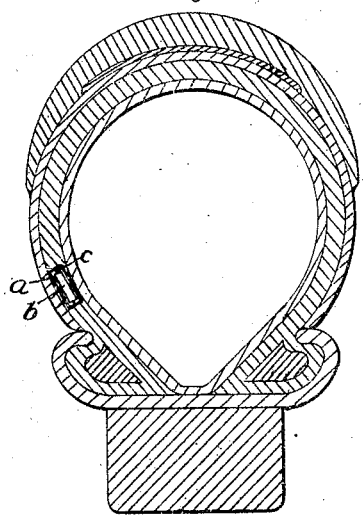
Figure 2:
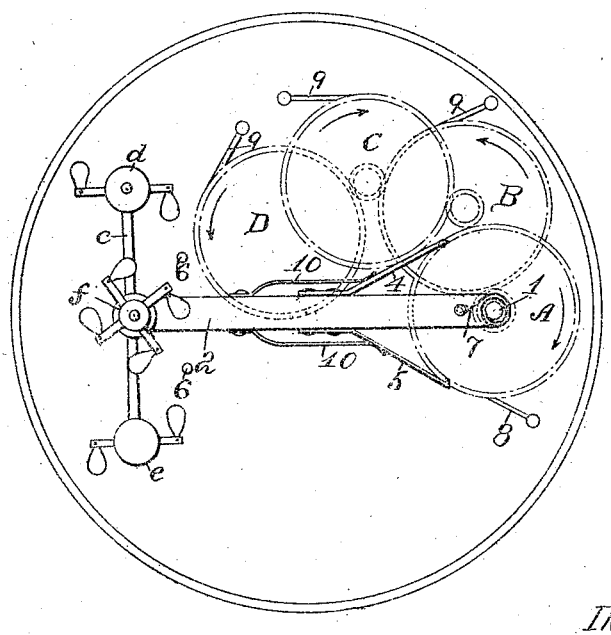

In the accompanying drawings Figure 1 is a sectional view of a tire of ordinary construction showing my detector or indicator carried thereby. Fig. 2 is a plan view of the form of registering device or revolution counter which may represent any improved form of such a device, the view shown being very much enlarged.

In the accompanying figures, I may, as shown in Fig. 1, recess the tire to receive the indicator, and I prefer to do this, as shown in Fig. 1, in such a location as to be subjected to the least amount of strain. Where the indicator is entirely concealed I prefer to line the recess with a stout metal lining $a$, which will resist the tendency to pressure inward and within this casing I pivot or swivel the casing $b$, containing the registering mechanism. I find that I can make the parts so small as to leave a distinct space between the recess casing $a$ and the casing of the register or indicator, and thus the register is protected from any pressure which will derange or interfere with the proper working of the registering mechanism. The pivots of the register casing are shown at $c$.

In Fig. 2 I have shown the registering mechanism, and this, shown in a conventional form, may be of any improved construction consisting of a series of wheels meshing with each other, constituting a train of registering gears which indicate the number of miles traveled. These are shown at A, B, C, and D. The wheel A has a spindle or shaft 1, and pivoted thereto is a lever 2 which has a weighted end of any design, this lever carrying a push pawl 4, and a pull pawl 5 engaging teeth on the periphery of the wheel A. The push pawl 4 abuts and impacts against one of the teeth on the wheel A and thus constitutes the impact producing member which causes the wheel A to advance. In a similar way the pull pawl 5 acting upon the teeth on an opposed edge of the wheel, impacts against and exercises thrust in an opposite direction. The teeth of the wheel A receiving this impact or thrust constitute impact receiving member, which, due to their capacity to receive said impact and to move in a direction away from it, cause the indicating mechanism to become responsive in accordance with the distance traversed by the wheel of the vehicle. On every revolution of the wheel the weighted lever is thrown down against the stop 6 and against the tension of a spring 7, and the movement of the weight or long end of the lever actuates the pawls. As soon as the lever has been thrown downward, the spring 7 exerts its force and throws it up again where it remains until the next revolution of the wheel throws it downward. Every revolution moves the wheel A step by step, and so the number of revolutions are indicated through the train of gearing in order and in the usual way, and the sum of the revolutions may be indicated by a suitable dial or dials on the front of the casing. A holding pawl 8 is provided for the wheel A and pawls 9 are provided for the other wheels. Springs 10 keep the pawls 4 and 5 in position.

While I may construct the lever 2 with an ordinary weighted end extending at right angles to the body of the lever, I prefer to provide a pivoted end to the lever as shown at c, this lever carrying upon its opposite ends weight sections d, e, having a rotating weight section f arranged centrally. This gives more elasticity and life to the lever and assures its proper reciprocation under centrifugal force and the attraction of gravitation; that is, the fact that a moving element is incorporated upon the long end of the lever tends to diminish the effect of shocks and to make the lever more responsive, than if it were rigid throughout, to the requirements of the device taking into consideration the effects of the centrifugal force and gravitation, both of which are active factors throughout such times as the device is doing its work. It is important to have the lever 2 sufficiently weighted so that the attraction of gravitation will overcome the centrifugal force and assure reciprocation in every rotation of the wheel so that the pawls will move the gearing step by step in every reciprocation of the lever.

I do not limit myself as to the form of the lever, and its parts, as the construction may be varied in many ways.

I claim:

1. A tire having a covered cavity and a register located therein, the actuation of the register being controlled by the movement of the tire, substantially as described.

2. A tire having a recess in the body thereof, a protecting casing located within the recess and a travel detector or indicator within the casing actuated by the movement of the tire, substantially as described.

3. The combination with an automobile tire, of an automatically operated device situated within the same and independent of its structural composition for producing an indication of the mileage travel of the tire.

4. The combination of a vehicle wheel, a tire therefor, and means carried by said tire for indicating the extent of use to which the tire has been subjected, said means being actuated by gravity during rotation of the wheel.

5. The combination of a vehicle wheel, a tire therefor, an impact receiving means carried by said tire, an impact producing means also carried by said tire and coöperating with said impact receiving means to indicate the extent of use to which the tire has been subjected and means carried by said tire for moving said impact producing means.

6. The combination of a vehicle wheel, a tire therefor and carried within the body of said tire the following elements: an indicator to indicate the extent of use to which the tire has been subjected and means operative upon said indicator to cause a change in the relative positions of the components of the indicator in accordance with the distance traversed by the wheel.

In testimony whereof, I affix my signature in presence of two witnesses.

JACOB H. FRIEDENWALD.

Witnesses:
ETHEL KING,
ERNEST J. BULL.